Oct. 15, 1929. C. DAVIES 1,731,887
DETERMINING THE REQUIRED TEMPERATURE OF LIQUIDS OR SEMILIQUIDS
Filed Jan. 13, 1927
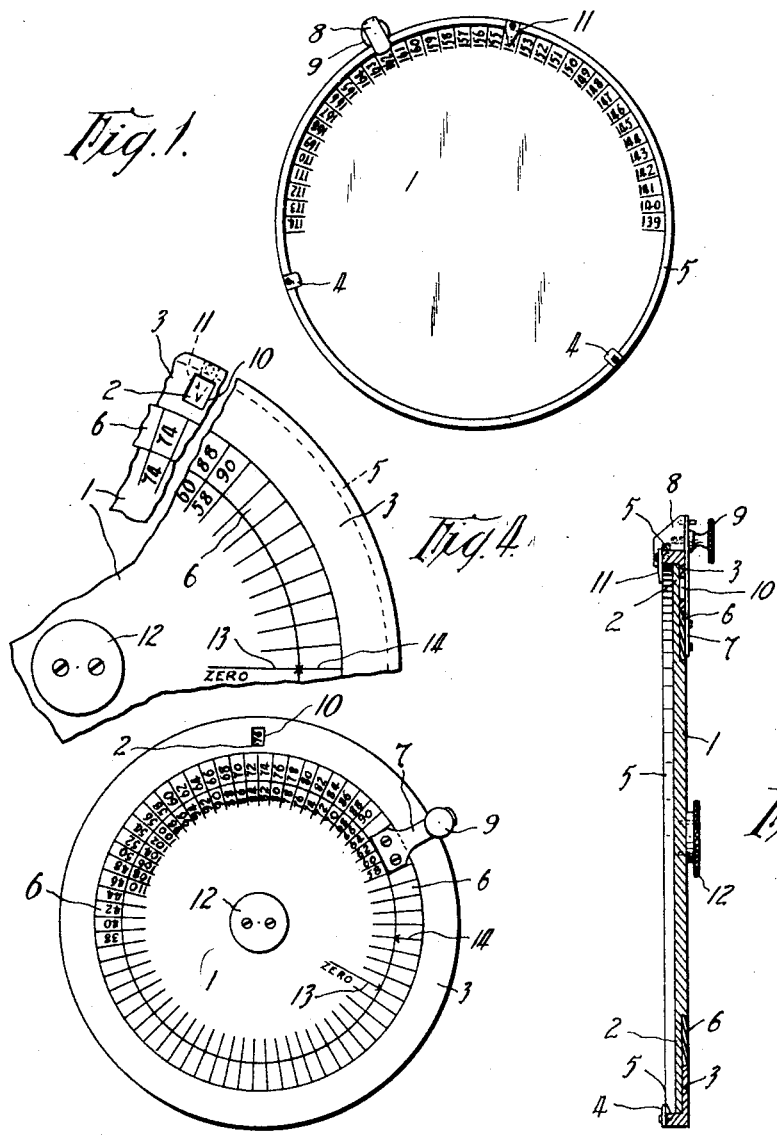

Patented Oct. 15, 1929

1,731,887

UNITED STATES PATENT OFFICE

CHARLES DAVIES, OF KENSINGTON, VICTORIA, AUSTRALIA

DETERMINING THE REQUIRED TEMPERATURE OF LIQUIDS OR SEMILIQUIDS

Application filed January 13, 1927, Serial No. 160,874, and in Australia March 31, 1926.

My invention relates to an instrument for calculating the required temperature of the liquid used in dough-making from the temperatures of the proving-room and of the flour and from a dough-constant determined from previous experiments; and the objects of my invention are, first, to provide an instrument by which the most suitable temperature for the liquid may be indicated on a scale of the instrument after it has been adjusted according to the temperatures of the proving-room and of the flour and according to the dough-constant; second, to provide such an instrument which may be set after adjustment to the particular dough-constant which applies to the particular conditions of working so that if the temperatures of the proving-room and of the flour are known the desired temperature of the liquid may be rapidly determined by turning a single portion of the instrument.

I attain these objects by the mechanism illustrated in the accompanying drawings, in which—

Figure 1 illustrates the rear of the instrument employed and hereinafter described.

Figure 2 illustrates the front of the instrument referred to in Figure 1.

Figure 3 is a sectional view drawn to a larger scale of the instrument while

Figure 4 is a section also drawn to a large scale of part of the instrument hereinafter described.

Similar numerals refer to similar parts throughout the several views.

In the accompanying drawings 1 is a disc whose base is extended to form an outer ring 2, a flanged rim 3 is slidably fitted on the outer edge of the ring 2 and held in position by clips 4 secured to the lower edge of the flange 5 of the rim 3. A ring 6 is slidably fitted between the disc 1 and the rim 3 and an arm 7 is mounted upon this ring 6 and extends over the edge of the rim 3 where it is provided with a clamp 8 operated by a thumb screw 9. The disc 1 is graduated according to the range of temperatures of the proving-room. These graduations may be numbered from 58° F. to 110° F. The slidable ring 6 is graduated according to the range of temperatures of the flour and the graduation marks may be numbered from 38° to 90° and run in an opposite direction to the graduation of the disc 1. The distance between two graduation marks on the outer periphery of the disc 1 is the same as the distance between two graduation marks on the inner periphery of the ring 6. The outer portion of the ring 2 is graduated on its upper face according to the range of temperatures of the liquid and these graduations may be numbered from 55° to 110° and run in the opposite direction to the graduations on the disc 1. The under face of the ring 2 near its outer edge is graduated according to the range of dough-constants. This range of constants may be numbered from 139 to 174 and run in the opposite direction to the graduations on the disc 1.

By experimental determination the temperature of liquid, of flour and of proving-room which give successful results in practice are noted from time to time and from these results the dough-constant is calculated for the particular conditions of the bakehouse and method used. This calculation is made by the following formula:—

$$\text{Dough-constant} = \frac{(\text{temperature of proving-room} + \text{temperature of flour})}{2} + \text{temperature of liquid};$$

so that when the dough-constant has thus been determined the desired temperature of the liquid may rapidly be determined when the temperature of the proving-room and the temperature of the flour have been ascertained. The liquid may then be brought to this desired temperature and the dough mixed under the most suitable conditions.

The rim 3 is provided with a slot 10 through which the desired temperature of the liquid is read after the instrument has been adjusted as hereinafter explained. The under face of the flange 5 is provided with an indicator 11 which may be a pointed extension of one of the clips 4, and is positioned at the rear of the slot 10 (see Fig. 4). A knob 12 is mounted on the disc 1 to facilitate the turning of this disc. A zero line 13 is marked on the outer edge of the disc 1 and a second zero line 14 is marked on the inner edge of the rim 6.

In the operation of the invention the disc 1 with its outer ring 2 is turned until the indicator 11 registers with the predetermined dough-constant on the under face of the ring 2 and is held in this position in relation to the rim 3 until the ring 6 has been turned to bring its zero line 14 into registration with the zero line 13 of the disc 1. The thumb screw 9 is now turned to clamp the ring 6 firmly to the rim 3. The instrument has now been set according to the particular dough-constant in question. The temperatures of the proving-room and of the flour are now determined by means of thermometers and the disc 1 is turned until this temperature of the proving-room as shown on the disc 1 registers with the temperature of the flour as shown on the ring 6. Thus if the temperature of the proving-room was 90° and the temperature of the flour 66° the graduation 90° on the disc 1 would be brought into registration with the graduation 66° on the ring 6. The most suitable temperature for the liquid in this instance 76 may then be read on the outer edge of the ring 2 through the slot 10.

Claims:

1. In an instrument for calculating the required temperature of the liquid used in dough making, a flanged rim having a window therein, a disc mounted to rotate in said rim and having a rabbeted margin adjacent to which on the disc is a scale of proving room temperatures, a reverse scale on the periphery below the flange of said rim and viewed through said window of corresponding liquid temperatures, a third scale on said disc representing corresponding dough constants, a pointer on the rim positioned relatively to the scale of dough constants and a ring movable on the rabbeted portion having a scale of flour temperatures cooperating with the scale of proving room temperatures.

2. In an instrument for calculating the required temperature of the liquid used in dough making, a flanged ring having a window therein, a circular plate having a rabbeted margin rotatably mounted in the rim, a ring mounted to rotate on said rabbet against said rim, an arm secured to said ring, and clamping means carried by the arm to clamp it to said rim, said rabbeted portion lying partly in said rim and viewable through the window.

3. In an instrument for calculating the required temperature of the liquid used in dough making, a flanged supporting rim having a window in its flange, a pointer secured to the rim at the window on its obverse side, a disc mounted to rotate in said rim and having a rabbeted margin having a liquid temperature scale viewable through said window, a dough constant scale on its obverse side movable with respect to said pointer and a proving room temperature scale adjacent said rabbet, a ring slidable on the disc between the rabbeted portion and rim having a liquid temperature scale thereon, an arm secured to the ring and a clamp on the arm engaging the rim.

4. In an instrument for calculating the required temperature of the liquid used in dough, a graduated first scale, a graduated second scale rigidly connected to said first scale, a graduated third scale rigidly connected to said second scale, sliding concentric indicating means, an indicator carried thereby and along said second scale, a second indicator carried by said sliding indicating means along said third scale, a sliding scale positioned between said first scale and said sliding indicating means, graduations on said sliding scale, and means for clamping said sliding indicating means to said sliding scale.

5. In an instrument for calculating the required temperature of the liquid used in dough making, a graduated disc, an outer ring rigidly connected to said disc, graduations on said outer ring, a sliding rim, an indicator carried by said rim along one scale of said outer ring, a second indicator carried by said rim along the other scale of said outer rim, a sliding ring positioned between said disc and said rim, graduations on said sliding ring and means for clamping said sliding ring to said rim.

6. In an instrument for calculating the required temperature of the liquid used in dough making, a graduated disc, a graduated ring rigidly connected to said disc, other graduations on said outer ring, a sliding rim positioned above said outer ring, a slot in said sliding rim, a depending flange on said sliding rim, a pointer inset from the lower edge of said flange, a sliding ring positioned between said disc and said rim, graduations on said sliding ring, an arm mounted on said sliding, and a clamp carried by said arm and engaging said rim.

In testimony whereof I have signed my name to this specification.

CHARLES DAVIES.